No. 707,120. Patented Aug. 19, 1902.
G. KILLIAN.
CAR WHEEL.
(Application filed Aug. 30, 1901.)
(No Model.)

Witnesses
Elmer Seavey
T. C. Glorius

Inventor,
George Killian,
By David Davis,
Associate Attorneys.

UNITED STATES PATENT OFFICE.

GEORGE KILLIAN, OF SCRANTON, PENNSYLVANIA.

CAR-WHEEL.

SPECIFICATION forming part of Letters Patent No. 707,120, dated August 19, 1902.

Application filed August 30, 1901. Serial No. 73,888. (No model.)

*To all whom it may concern:*

Be it known that I, GEORGE KILLIAN, a citizen of the United States, and a resident of Scranton, in the county of Lackawanna and State of Pennsylvania, have invented certain new and useful Improvements in Car-Wheels, of which the following is a complete specification, reference being made to the accompanying drawings, forming a part thereof, in which like figures of reference indicate like parts.

The object of this invention is to provide a car-wheel which shall combine the maximum of strength and lightness and in which the tire shall be detachable and at the same time not be liable to pull off from the main body of the wheel in case of breakage, as more fully hereinafter set forth; and the invention consists in certain novel features of construction hereinafter described and claimed.

Figure 1:
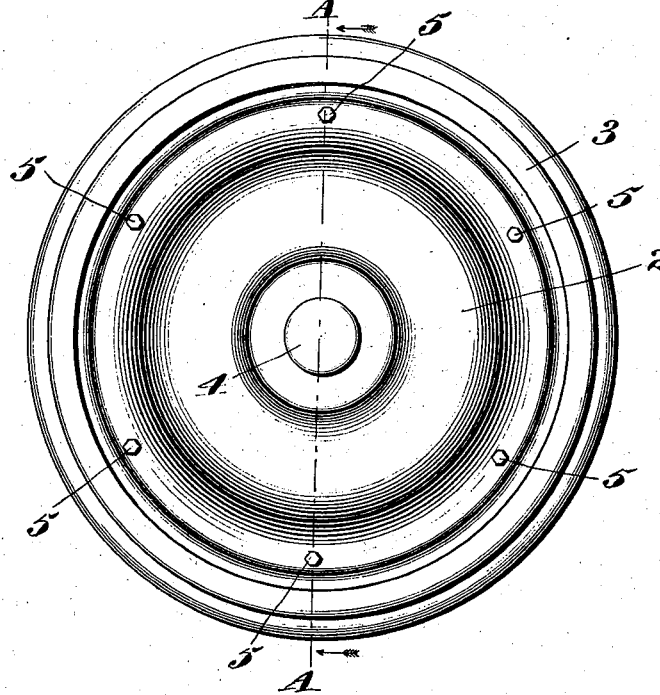
Figure 2:
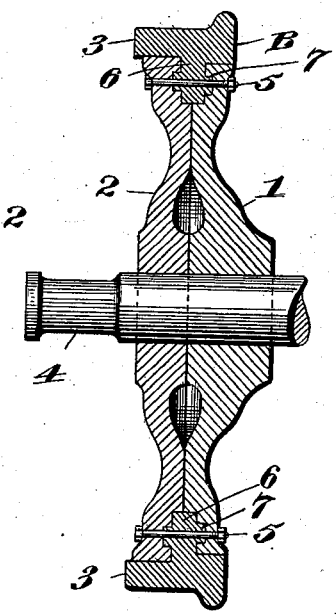
Figure 3:
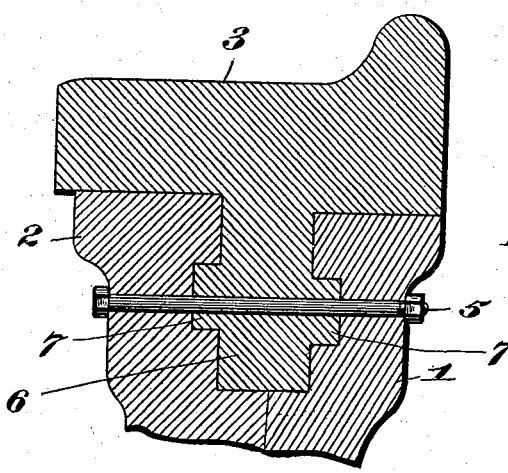

In the drawings annexed, Figure 1 is a side elevation of a car-wheel constructed according to my invention. Fig. 2 is a vertical sectional view thereof, taken on the line A A; and Fig. 3 is a detail sectional view, enlarged, of the tire and the adjacent parts of the body of the wheel.

Referring to the drawings by reference-numerals, 1 and 2 represent, respectively, the inner and outer sections of the wheel-body; 3, the tire; 4, the axle, and 5 the bolts connecting the tire to the wheel-body. The body-sections are disks which abut against each other at their adjacent faces and which are held closely together by being fitted tightly on the axle. The inner edges of their peripheries are grooved to receive between them an inwardly-extending annular flange 6, formed on the tire about midway between its inner and its outer edges, said flange 6 being provided with an annular subflange 7 on its inner side and also on its outer side. The inner face of the tire portion proper on each side of the flange 6 fits against and covers the respective peripheries of the body disks or plates, and at intervals bolts 5 are passed through the two disks and the flanges 6 and 7 to clamp the tire to the wheel, although it is probable that these bolts are not absolutely necessary to hold the tire in place in view of the rigid connection of the hubs of the body-plates to the axle.

It will be observed that the inner one of the subflanges 7 is nearer to the center of the wheel than the outer subflange. The object of this is to permit the inner disk to be made smaller in diameter than the outer disk and the inner edge of the tire adjacent to the rail-flange correspondingly thicker, whereby the tire will be rendered stronger at the point where the greatest strain and wear come—namely, where it bears upon the top of the rail.

It is obvious that I am not confined strictly to the exact construction shown and described, but may depart therefrom without departing from the spirit of the invention.

Having thus fully described my invention, what I claim, and desire to obtain by Letters Patent, is—

1. A car-wheel, comprised of two separate body-disks, the inner one being smaller in diameter than the outer one, a tire provided with an inward-extending flange clamped between the adjacent edges of said plates or disks, said plates or disks being grooved for the reception of said flange, and said tire bearing upon the peripheries of said disks and having the portion bearing on the inner disk thicker than the portion bearing on the outer disk, for the purposes set forth.

2. A car-wheel, consisting of a pair of separate disks, one being smaller in diameter than the other, and a tire bearing upon and covering the peripheries of said disks and provided with an inward-extending flange having lateral subflanges, the inner subflange being nearer the center of the wheel and the inner part of the tire bearing on the inner disk being thicker than the outer part of the tire, for the purposes set forth.

3. A car-wheel consisting of a pair of separate body-disks the inner one being smaller in diameter than the outer one, and a tire bearing upon and covering the peripheries of said disks, the portion of the tire bearing on the inner body-disk being as much thicker than the part bearing on the outer disk as the outer disk is greater in diameter than the inner disk, and means for attaching said tire to said plates.

In testimony whereof I have hereunto set my name, in the presence of two subscribing witnesses, this 22d day of August, 1901.

GEORGE KILLIAN.

Witnesses:
HARRY F. KILLIAN,
A. L. BRYDEN.